(12) United States Patent
Bernaudin et al.

(10) Patent No.: US 9,807,609 B2
(45) Date of Patent: Oct. 31, 2017

(54) MULTIPLE PROFILES ON A SHARED COMPUTING DEVICE

(71) Applicants: Ingrid Bernaudin, Palo Alto, CA (US);
Animesh Das, Palo Alto, CA (US);
Frank Wang, Santa Clara, CA (US);
Steve Zyszkiewicz, Palo Alto, CA (US)

(72) Inventors: Ingrid Bernaudin, Palo Alto, CA (US);
Animesh Das, Palo Alto, CA (US);
Frank Wang, Santa Clara, CA (US);
Steve Zyszkiewicz, Palo Alto, CA (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 237 days.

(21) Appl. No.: 14/143,901

(22) Filed: Dec. 30, 2013

(65) Prior Publication Data
US 2015/0142974 A1 May 21, 2015

Related U.S. Application Data (60) Provisional application No. 61/904,985, filed on Nov. 15, 2013.

(51) Int. Cl.
*H04L 29/08* (2006.01)
*G06F 15/16* (2006.01)
*G06F 15/173* (2006.01)
*H04W 12/06* (2009.01)
*H04L 29/06* (2006.01)

(52) U.S. Cl.
CPC ............. *H04W 12/06* (2013.01); *H04L 67/08* (2013.01); *H04L 67/306* (2013.01); *H04L 63/102* (2013.01)

(58) Field of Classification Search
USPC ........................................................ 709/225
See application file for complete search history.

(56) References Cited

U.S. PATENT DOCUMENTS

| | | | |
|---|---|---|---|
| 2010/0061533 A1* | 3/2010 | Rice ................. | H04M 3/42272 379/201.03 |
| 2011/0265089 A1* | 10/2011 | Ostojic ................. | G06F 9/4818 718/103 |
| 2012/0197967 A1* | 8/2012 | Sivavakeesar ......... | G06Q 50/01 709/203 |
| 2013/0111606 A1* | 5/2013 | Gu ....................... | G06F 21/6218 726/28 |
| 2013/0160141 A1* | 6/2013 | Tseng .................. | G06F 21/6245 726/28 |

(Continued)

*Primary Examiner* — Philip Chea
*Assistant Examiner* — Hassan Khan
(74) *Attorney, Agent, or Firm* — Fountainhead Law Group P.C.

(57) ABSTRACT

Techniques are described for activating multiple profiles on a shared mobile computing device. Each profile can be used to establish a connection with an instance of an application where the application instances can potentially be hosted on different servers. Due to the fact that the activation process to activate a profile on the shared device can be time consuming and require interacting with other devices or servers, the techniques described allow multiple profiles to be activated on a shared mobile computing device. Access to each of the profiles is controlled by a login process. During logging out of a profile, the cache of the shared mobile computing device can be cleared to improve security.

11 Claims, 7 Drawing Sheets

(56) References Cited

U.S. PATENT DOCUMENTS

| | | | | |
|---|---|---|---|---|
| 2013/0174244 A1* | 7/2013 | Taveau | ............... | G06F 21/30 |
| | | | | 726/9 |
| 2013/0316809 A1* | 11/2013 | Katz | ............... | G07F 17/3241 |
| | | | | 463/29 |
| 2014/0006346 A1* | 1/2014 | Davis | ............... | G06F 9/4451 |
| | | | | 707/613 |
| 2014/0068755 A1* | 3/2014 | King | ............... | G06F 21/53 |
| | | | | 726/19 |
| 2014/0113646 A1* | 4/2014 | Maggenti | ............... | H04L 67/306 |
| | | | | 455/452.1 |
| 2014/0115490 A1* | 4/2014 | Yamasani | ............... | G06F 21/604 |
| | | | | 715/743 |
| 2014/0115514 A1* | 4/2014 | Hackborn | ............... | G06F 3/0481 |
| | | | | 715/771 |
| 2014/0123222 A1* | 5/2014 | Omar | ............... | H04L 63/102 |
| | | | | 726/3 |
| 2014/0379801 A1* | 12/2014 | Gupta | ............... | H04L 67/306 |
| | | | | 709/204 |
| 2015/0012995 A1* | 1/2015 | Korat | ............... | H04W 12/06 |
| | | | | 726/8 |

\* cited by examiner

MULTIPLE PROFILES ON A SHARED COMPUTING DEVICE

CROSS REFERENCE TO RELATED APPLICATIONS

The present disclosure is a continuation of and claims priority to U.S. Patent App. No. 61/904,985 for "Multiple Profiles On A Shared Computing Device" filed Nov. 15, 2013, which is hereby incorporated herein by reference in its entirety for all purposes.

BACKGROUND

Software as a Service (SaaS) is a software application delivery model where an application service provider (ASP) hosts software applications and associated data on the cloud. Multiple instances of a software application can be stored on the cloud where each application instance has functionality that is tailored for a particular tenant (i.e., customer) or a particular group of users that belong to the tenant. This results in some application instances having different functionality than others. The application instances can be stored on one or more data centers (i.e., servers) in the cloud. In a multi-tenant environment, a particular data center can store one or more application instances for multiple tenants.

To gain access to an application instance on a mobile computing device, a user needs to go through an activation process with the application instance in order to gain authorization. The activation process can include security checks with the application instance or the data center. Once authorization is granted, the user can access the application instance by using a thin client such as a web browser on the mobile computing device. When the user has finished using the application instance, the user deactivates the application instance from the mobile computing device, thereby leaving the mobile computing device ready to handle the next user's request.

Due to security considerations, a user must go through the activation process each time that the user wishes to use the application. Different users can connect to different data centers and thus the security checks can vary as each user attempts to active a mobile computing device. This activation process can be very time consuming. Moreover in an enterprise environment where data security is important, the activation process can be particularly complex. Thus, there is a need for improved techniques to access applications in a SaaS model.

SUMMARY

In one embodiment, a computer-implemented method performs, by a mobile computing device, a first activation process to activate a first profile on the mobile computing device, the first profile including a first connection information to establish a first connection with a first application instance. The method then continues with performing, by the mobile computing device, a second activation process to activate a second profile on the mobile computing device, the second profile including a second connection information to allow the second profile to establish a second connection with a second application instance. The method then receives, by the mobile computing device, a first credential configured to log into the first profile. The method then logs, by the mobile computing device, the first profile into the mobile computing device in response to the first credential. After logging the first profile into the mobile computing device, the method establishes, by the mobile computing device, the first connection with the first application instance according to the first connection information. After establishing the first connection, the method can access, by the mobile computing device, data from the first application instance when the first connection has been established. The first profile and the second profile can remain simultaneously activated on the mobile computing device for a period of time.

In one example, the method further includes receiving a log out request associated with the first profile and logging the first profile out of the mobile computing device in response to the log out request, wherein logging the first profile out includes clearing a cache of the mobile computing device. Logging the first profile out can further include transmitting the cache to a server before clearing the cache, wherein the cache is retrieved from the server when the first profile logs back into the mobile computing device. The cache can store at least a portion of the data from the first application instance.

In another example, the first application instance resides on a first server and the second application instance resides on a second server.

In another example, the first profile belongs to a first user and the second profile belongs to a second user. The method can further comprise concealing a push notification of the second profile when the push notification is received while the first profile is logged into the mobile computing device.

In another embodiment, a non-transitory computer readable storage medium stores one or more programs comprising instructions for receiving a table containing a plurality of entries, each entry storing plain text. The one or more programs further include instructions for performing a first activation process to activate a first profile on a mobile computing device, the first profile including a first connection information to establish a first connection with a first application instance, performing a second activation process to activate a second profile on the mobile computing device, the second profile including a second connection information to allow the second profile to establish a second connection with a second application instance, receiving a first credential configured to log into the first profile, logging the first profile into the mobile computing device in response to the first credential, establishing the first connection with the first application instance according to the first connection information, and accessing data from the first application instance when the first connection has been established, wherein the first profile and the second profile remain simultaneously activated on the mobile computing device for a period of time.

In another embodiment, a computer implemented system comprises one or more computer processors and a non-transitory computer-readable storage medium. The non-transitory computer-readable storage medium comprises instructions, that when executed, control the one or more computer processors to be configured for performing a first activation process to activate a first profile on a mobile computing device, the first profile including a first connection information to establish a first connection with a first application instance, performing a second activation process to activate a second profile on the mobile computing device, the second profile including a second connection information to allow the second profile to establish a second connection with a second application instance, receiving a first credential configured to log into the first profile, logging the first profile into the mobile computing device in response to the first credential, establishing the first connection with the first application instance according to the first connection information, and accessing data from the first application instance when the first connection has been established, wherein the first profile and the second profile remain simultaneously activated on the mobile computing device for a period of time.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
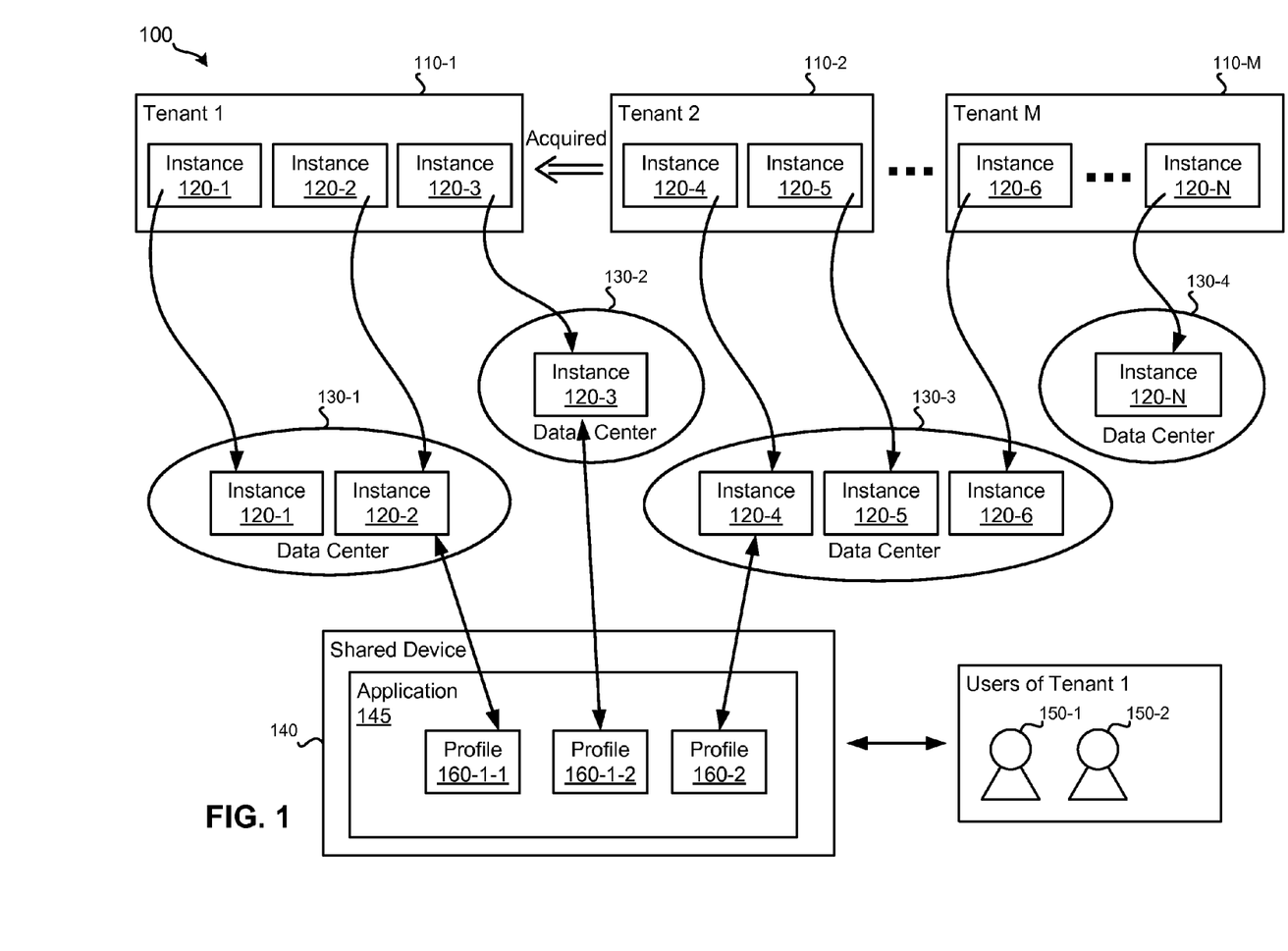
FIG. 1 illustrates a system for accessing application instances on a mobile computing device according to one embodiment.

FIG. 1 illustrates system 100 for accessing application instances on a mobile computing device according to one embodiment. System 100 includes multiple tenants—tenant 1 110-1, tenant 2 110-2, up to tenant M 110-M. Each tenant represents an entity such as a software company that is producing application that are stored on the cloud. For example, tenant 1 110-1 produces application instances 120-1, 120-2, and 120-3. Tenant 2 110-2 produces application instances 120-4 and 120-5. Tenant M 110-M produces application instances 120-6 through 120-N. In some examples, a tenant can produce multiple application instances of the same application where each application instance has a Each application instance is stored in a data center on the cloud. A data center is a collection of one or more servers that are configured to host one or more application instances. In one embodiment, a tenant can store application instances across multiple data centers. For example, data center 130-1 hosts application instances 120-1 and 120-2 while data center 130-2 hosts application instance 120-3. In other words, tenant 1 110-1 hosts application instances on data centers 130-1 and 130-2. In another embodiment, multiple tenants can store application instances on the same data center. For example, data center 130-3 hosts application instances 120-4, 120-5, and 120-6. While applicant instances 120-4 and 120-5 are created by tenant 2 110-2, application instance 120-6 is created by tenant M 110-M. In other words, tenant 2 110-2 and tenant M 110-M both store application instances on data center 130-3. In this embodiment, application instances 120-1 and 120-2 of tenant 1 110-1 are hosted by data center 130-1, application instance 120-3 of tenant 1 110-1 is hosted by data center 130-2, application instances 120-4 and 120-5 of tenant 2 110-2 are hosted by data center 130-3, application instance 120-6 of tenant M 110-M is also hosted by data center 130-3, and application instance 120-N of tenant M 110-M is hosted by data center 130-4. Furthermore, tenant 1 110-1 has acquired tenant 2 110-2. As a result, the users of tenant 2 110-2 also belong to tenant 1 110-1. Thus, the users of tenant 1 110-1 also include the users of tenant 2 110-2.

As shown here, system 100 includes shared device 140. Shared device 140 can be a mobile computing device having a processor that executes application 145. Application 145 can be configured to provide users access to application instances. Each user of shared device 140 can perform one or more activation processes to activate (e.g., set up) one or more profiles on application 145. Each profile when activated allows a user to have access to an application instance hosted on a data center. As a result, application 145 can include multiple profiles to communicate with multiple application instances that are hosted on multiple data centers. In some examples, a user may need to log into an activated profile before the user access the corresponding application instance. In other examples, a user may need to log into an activated profile before a connection with the corresponding application instance is established. A user of shared device 140 can log into a profile and gain access to an application instance being hosted on a data center for the duration that the user is logged into the profile. Here, user 150-1 of tenant 1 110-1 sets up profile 160-1-1 to communicate with instance 120-2 and sets up profile 160-1-2 to communicate with instance 120-3. User 150-2 sets up profile 160-2 to communicate with instance 120-4. Tenant 2 110-2 has been acquired by tenant 1 110-1 and thus user 150-1 and 150-2 both belong to tenant 1 110-1. A user can gain access to a profile on application 145 by providing credentials to log into the profile. Once logged in, the corresponding application instance is accessible to the user via application 145. When the user logs out of application 145, another user (e.g., user 150-2) log into another profile of application 145 to gain access to another application instance. In some examples, the users all belong to the same tenant. In other examples, the users can be from different tenants.

A user can perform an activation process to activate a profile on application 145. The activation process can serve to authenticate the user and/or provide the information necessary to establish a connection between shared device 140 and a desired application instance being hosted by a data center. The activation process can generate connection information that is stored on shared device 140. The connection information can allow application 145 to recreate the connection without having the user performing the activation process a second time. For instance, application 145 can allow a user to log into a profile rather than preforming the activation process a second time. Once the profile is activated, application 145 can be used to communicate and access data from the corresponding application instance. In some examples, the user is automatically logged into the profile when the profile is activated. Here, user 150-1 can perform an activation process to activate profile 160-1-1 on application 145. Once activated, a connection between shared device 140 and data center 130-1 is generated to allow application 145 to access application instance 120-2. User 150-1 can continue to access application instance 120-2 until user 150-1 logs out of application 145. After logging out of application 145, another user (e.g., user 150-2) can user shared device 140 to log into a profile or to perform an activation process to activate a new profile. In some examples, the activation process can be data center dependent and/or application instance dependent.

Figure 2:
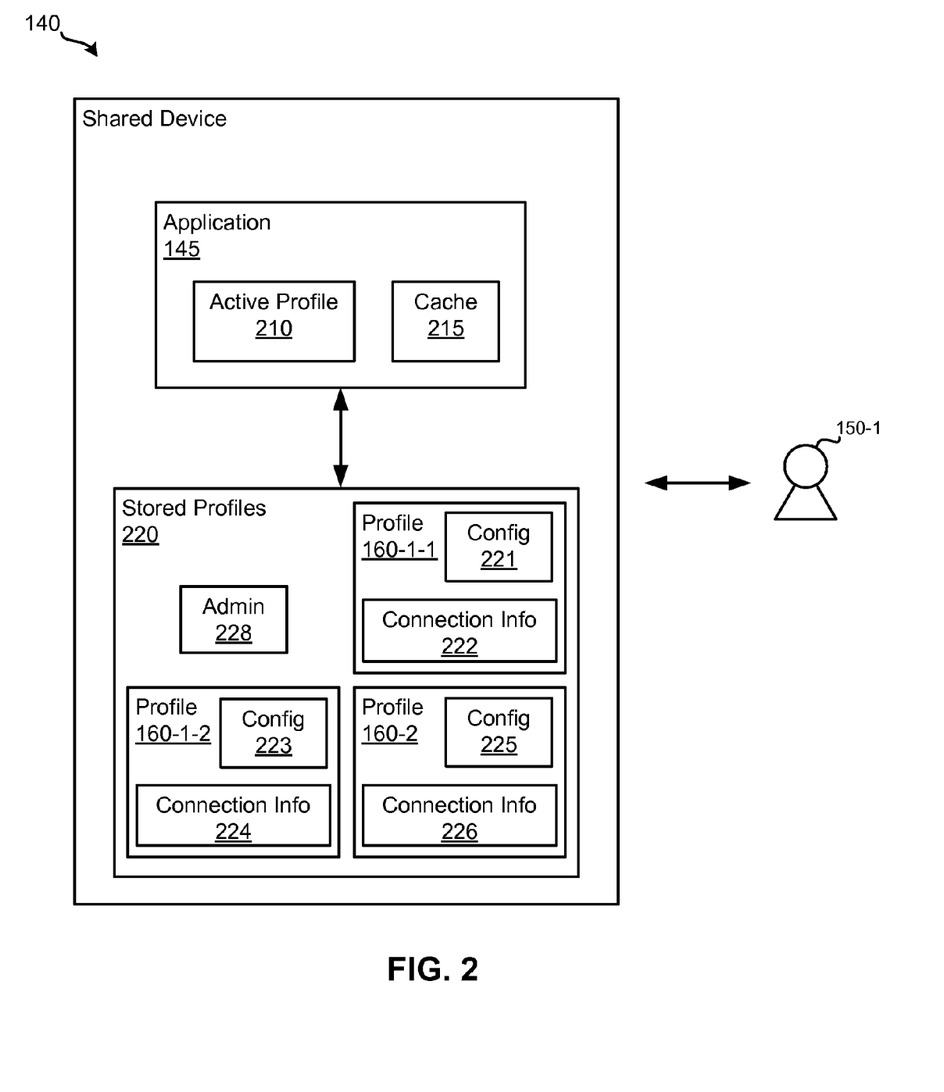
FIG. 2 illustrates a shared device according to one embodiment.

FIG. 2 illustrates shared device 140 according to one embodiment. User 150-1 of shared device 140 can run application 145 to access an application instance being hosted on a data center. Shared device 140 includes stored profiles 220. In one embodiment, application 145 can activate a new profile in stored profiles 220. To activate a new profile, application 145 can guide user 150-1 through an activation process to set up a connection between shared device 140 and a desired application instance. The application process can include authenticating user 150-1 to ensure this is a valid activation and transmitting a unique identifier of shared device 140 to a server so that shared device 140 can be added to a white list (i.e., safe list) of devices which can be connected to the desired application instance. Upon completion of the activation process, a new profile is stored in stored profiled 220. The new profile can include connection information to establish a connection between shared device 140 and the desired application instance. This connection information can include the address of the desired application instance, credentials to authenticate with the desired application instance, and any sign-in protocols that are associated with the desired application instance.

In another embodiment, application 145 can log into one of the profiles in stored profiles 220. The profiles in stored profiles 220 can be pre-defined on shared device 140 or set up through an activation process. To log into a profile, application 145 can authenticate user 150-1 as the owner of the desired profile. For example, user 150-1 can enter credentials into application 145 to authenticate himself as the owner of profile 160-1-1. The credentials can include an alphanumeric password, a token, a multi-digit number, or other information that can be used to certify user 150 as the owner of profile 160-1-1. Once authenticated, the selected profile can be set as active profile 210. In one example, application 145 can only have one profile set active at a time. Therefore active profile 210 must be deactivated before another profile can be activated. In another example, application 145 can have multiple profiles set active at a time so long as some predefined conditions are met. For instance, application 145 can have profile 160-1-1 and 160-1-2, which both belong to user 150-1, be active simultaneously. This would result in active connections with application instances 120-2 and 120-3 at the same time. In some examples, the information from the two or more active connections can be aggregated and presented to user 150-1.

Each profile in stored profiles 220 can contain connection information and configuration information. Here, profile 160-1-1 contains configuration information 221 and connection information 222, profile 160-1-2 contains configuration information 123 and connection information 124, and profile 160-2 contains configuration information 125 and connection information 226. Application 145 can utilize the connection information to establish a connection with an application instance that corresponds to active profile 210 when user 150-1 logs into a profile. The connection information can be populated when the profile is activated through the activation process. Application 145 can utilize the configuration information to configure the application instance after a connection with the application instance has been established using the connection information. Configuration can include setting the preferences of user 150-1 such as the font size, background color, language, and other audible or visual settings. In some examples, one or more of the preferences can be overridden by an admin profile on shared device 140. For example, admin 228 of stored profile 220 can point to a profile in stored profiles 220 that has been designated as the admin profile. Certain predefined preferences such as the language preference can be set by the admin profile, regardless of whether the admin profile is active profile 210. In one example, application 145 can automatically set the first profile that is stored in stored profiles 220 as the admin profile. In another example, the admin profile can be set manually. In yet another example, deleting the admin profile from stored profiles 220 can result in application 145 automatically deleting all the profiles in stored profiles 220.

As application 145 is utilized to access the application instance that corresponds with active profile 210, information related to user 150-1 or the application instance can be cached in cache 215. Caching some of the information can be useful to improve performance of application 145. In one embodiment, application 145 can clear cache 215 when user 150-1 logs out of active application 210. This can include deleting search history, activity log, accessed information from the application instance, and/or data retrieved from the application instance. By clearing cache 215, the activity and data of user 150-1 remains secure from other users of shared device 140. In another embodiment, application 145 can leave data in cache 215 during logging out of active profile 210 when shared device 140 is configured as a device for a single user. In yet another embodiment, application 145 can leave data in cache 215 during logging out of active profile 210 when user 150-1 is logged into multiple profiles on shared device 140. When user 150-1 eventually logs out of his multiple profiles on shared device 140, application 145 can clear cache 215 at that time. In yet other embodiments, application 145 can transmit the data in cache 215 to a remote server that is part of a data center. When user 150-1 logs back into the profile, cache 215 can be repopulated with the stored data. This can allow user 150-1 to still retain his action history, progress, or data when he logs back into the profile.

Figure 3:
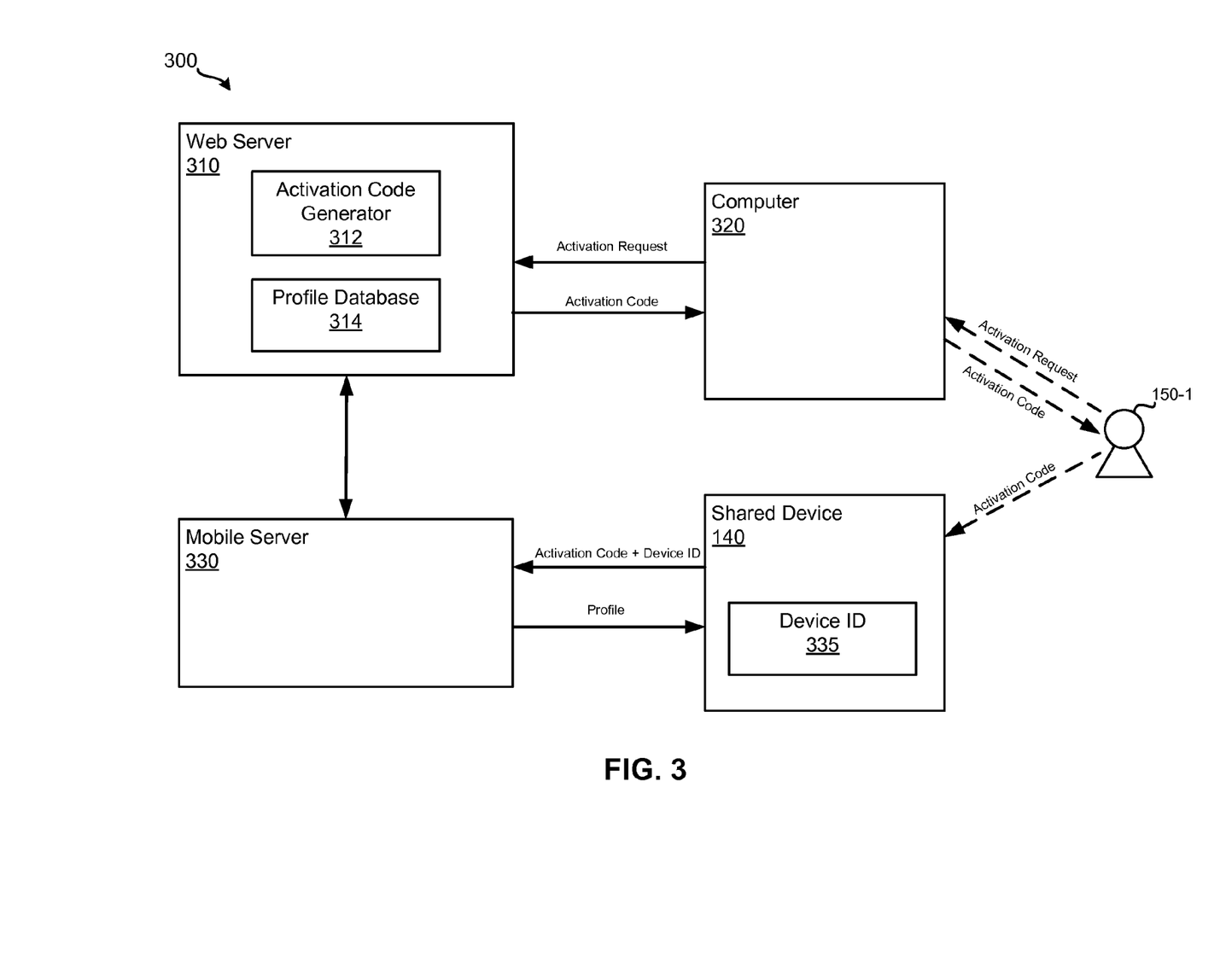
FIG. 3 illustrates a system for activating a profile on a shared device according to one embodiment.

FIG. 3 illustrates system 300 for activating a profile on shared device 145 according to one embodiment. System 300 includes web server 310, computer 320, mobile server 330, and shared device 140. Together, these components can communicate with one another to activate a profile on shared device 140. Web server 310, which can be part of a data center, includes activation code generator 312 and profile database 314. Activation code generator 312 is configured to generate an activation code for activating a profile from profile database 314 on shared device 140. The activated profile on shared device 140 would allow shared device 140 to establish a connection with a desired application instance as user 150-1.

In this embodiment, user 150-1 instructs computer 320 to transmit an activation request to web server 310. The activation request can include a unique identifier that is associated with user 150-1. Web server 310 can receive the activation request and look up the unique identifier in profile database 314 to verify that user 150-1 has an existing profile. The activation request can also be used to determine whether user 150-1 is authorized to establish a connection with the desired application instance. Once web server 310 validates the activation request, web server 310 can call activation code generator 312 to generate an activation code. The activation code can be linked to the user's profile and when entered into a shared device, be used to activate a profile on the shared device. In some examples, the activation code can be configured for a single use. Web server 310 transmits the activation code back to computer 320 where the activation code can be received by user 150-1.

With the activation code, user 150-1 selects a shared device which user 150-1 would like to activate a profile on and enters the activation code into the shared device. In this embodiment, user 150-1 enters the activation code into shared device 140. Shared device 140 receives the activation code and transmits the activation code along with device ID 335, which is a unique identifier for shared device 140 to mobile server 330. Mobile server 330 is configured to communicate with shared device 140 and web server 310. Mobile server 330 can take the received activation code with device ID 335 and communicate with web server 310 to generate the profile, which is in turn transmitted from mobile server 330 to shared device 140. Shared device 140 can store the generated profile, which completes the activation process. The generated profile can include connection information for establishing a connection with a desired application instance and configuration information to configure the application instance when accessed on shared device 140.

While the generation of an activation code is described in this embodiment, web server 310 can alternatively generate an activation link or activation key in other embodiments. For instance, web server 310 can generate an activation link and transmit the activation link to user 150-1's email account on shared device 140. When user 150-1 selects the activation link, an automated process can be executed to share identifying information of shared device 140 with web server 310. Web server 310 can use the identifying information and generate a profile which is in turn stored on shared device 140. In other embodiments, the profile can be generated by shared device 140 by using connection information received from web server 310.

Figure 4:
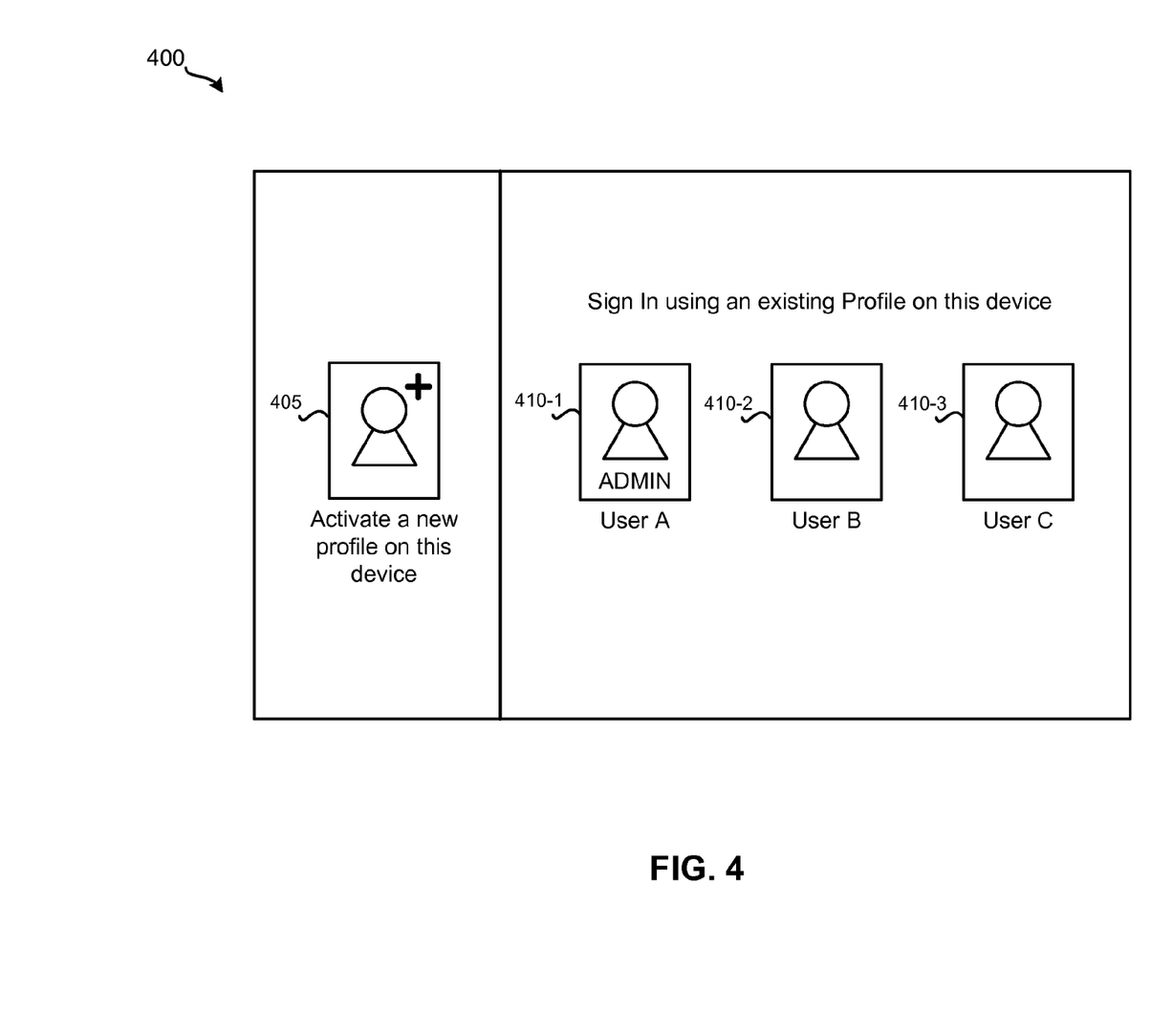
FIG. 4 illustrates a user interface for logging into a profile on a shared device according to one embodiment.

FIG. 4 illustrates user interface 400 for logging into a profile on a shared device according to one embodiment. User interface 400 can generated by application 145 on shared device 140. User interface 400 includes selectable icons 410-1, 410-2, and 410-3. Each icon represents a profile stored on shared device 140. When one of the selectable icons is selected, user interface 400 transitions to another page (not shown) where user credentials can be entered to validate user 150-1 as the owner of the selected profile. In some examples, the user credentials can be a multi-digit pin, a password, or a single sign-on service.

Figure 5:
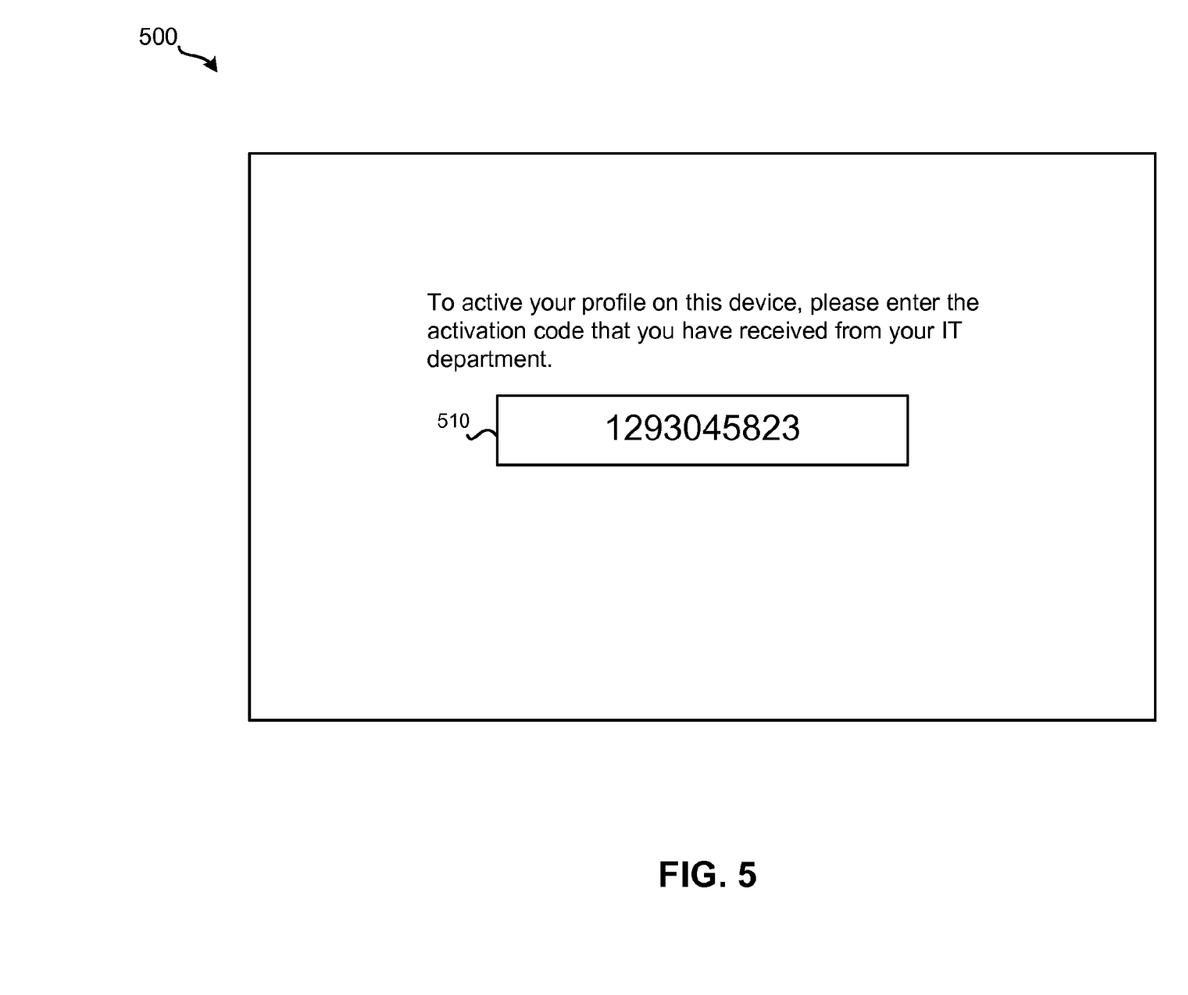
FIG. 5 illustrates a user interface for entering an activation code according to one embodiment.

User interface 400 further includes selectable icon 405. Selectable icon 405 can be used to activate a new profile on shared device 140. Selecting selectable icon 405 can result in user interface 400 transitioning to another page (not shown) where a portion of the activation process can be performed. The portion of the activation process that is performed on shared device 140 can include entering an activation code. FIG. 5 illustrates user interface 500 for entering an activation code according to one embodiment. As shown, user interface 500 includes field 510 for entering an activation code. Once entered, application 145 can process the activation code to activate a profile on shared device 140. In some examples, setting up the profile on shared device 140 can be as simple as entering the activation code or selecting an activation link.

Figure 6:
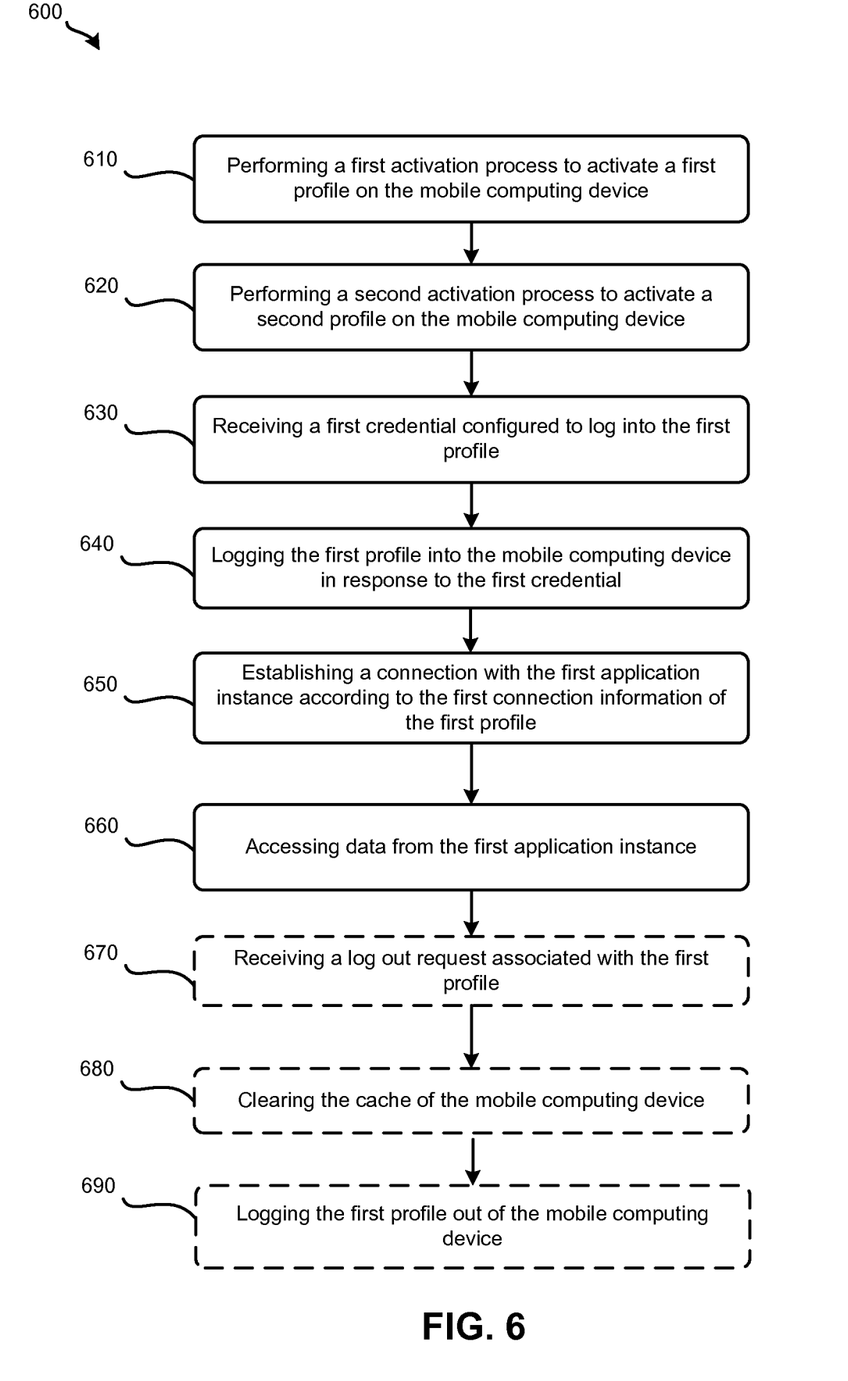
FIG. 6 illustrates a process for accessing an application instance hosted by a data center.

FIG. 6 illustrates process 600 for accessing an application instance hosted by a data center. Process 600 can be stored in computer readable code and executed by a mobile computing device. For example, process 600 can be a part of the computer readable code of application 145 which is executed by shared device 140. Process 600 begins by performing a first activation process to activate a first profile on the mobile computing device at 610. The activation process can include selecting an icon to activate a new profile on the mobile computing device followed by entering an authorization code that is associated with the new profile. In some examples, the activation process is not confined to the mobile computing device. For example, the mobile computing device may communicate with other servers and computing devices to activate the first profile. Thus, only a portion of the activation process is performed by the mobile computing device. The new profile, when activated, includes a first connection information to establish a first connection with a first application instance.

Process 600 continues by performing a second activation process to activate a second profile on the mobile computing device at 620. The second activation process can be the same or different than the first activation process. For example, both activation processes can involve selecting an icon to activate a new profile on the mobile computing device followed by entering an authorization code. In another example, an activation code can be used to activate the first profile while an activation link is can be used to activate the second profile. At this point, the first profile and the second profile are both activated on the mobile computing device at the same time. In some examples, the first application instance and the second application instance can be the same application but configured differently to offer different functionality.

Process 600 then continues by receiving a first credential configured to log into the first profile at 630. The first credential can be received through a user interface of shared device 140. In some examples, the first credential can be a multi-digit pin, alphanumeric password, or other security credential. After receiving the first credential, process 600 continues by logging the first profile into the mobile computing device in response to the first credential at 640. In contrast to the activating a profile which requires communicating between various devices and servers, logging into a profile can be confined to the mobile computing device. The mobile computing device can verify the first credential and log in the first profile.

After the first profile is logged in, process 600 continues by establishing a connection with the first application instance at 650. The connection can be established according to the first connection information of the first profile. In some embodiments, the connection can remain established while the profile is activated on the mobile computing device. Thus, connections with multiple application instances can be simultaneously established on the mobile computing device.

After establishing the connection, process 600 continues by accessing data from the first application instance at 660. This can include accessing the first application instance on the mobile computing device and performing tasks such as training and review that are offered by the first application instance. After accessing the data, process 600 can optionally receive a log out request associated with the first profile at 670. When the log out request is received, process 600 can continue by clearing the cache of the mobile computing device at 680. Clearing the cache can improve the security of the mobile computing device by preventing subsequent users from snooping the cache in search of information associated with user 150-1. In some embodiments, data in the cache can be stored at a remote location before the cache is cleared. This allows the cache to be removed from the mobile computing device to improve the security when user 150-1 logs out of the mobile computing device. When user 150-1 logs back into the mobile computing device, the data in the cache that was stored remotely can be retrieved and stored in the cache. After clearing the cache, process 600 continues by logging the first profile out of the mobile computing device at 690.

Figure 7:
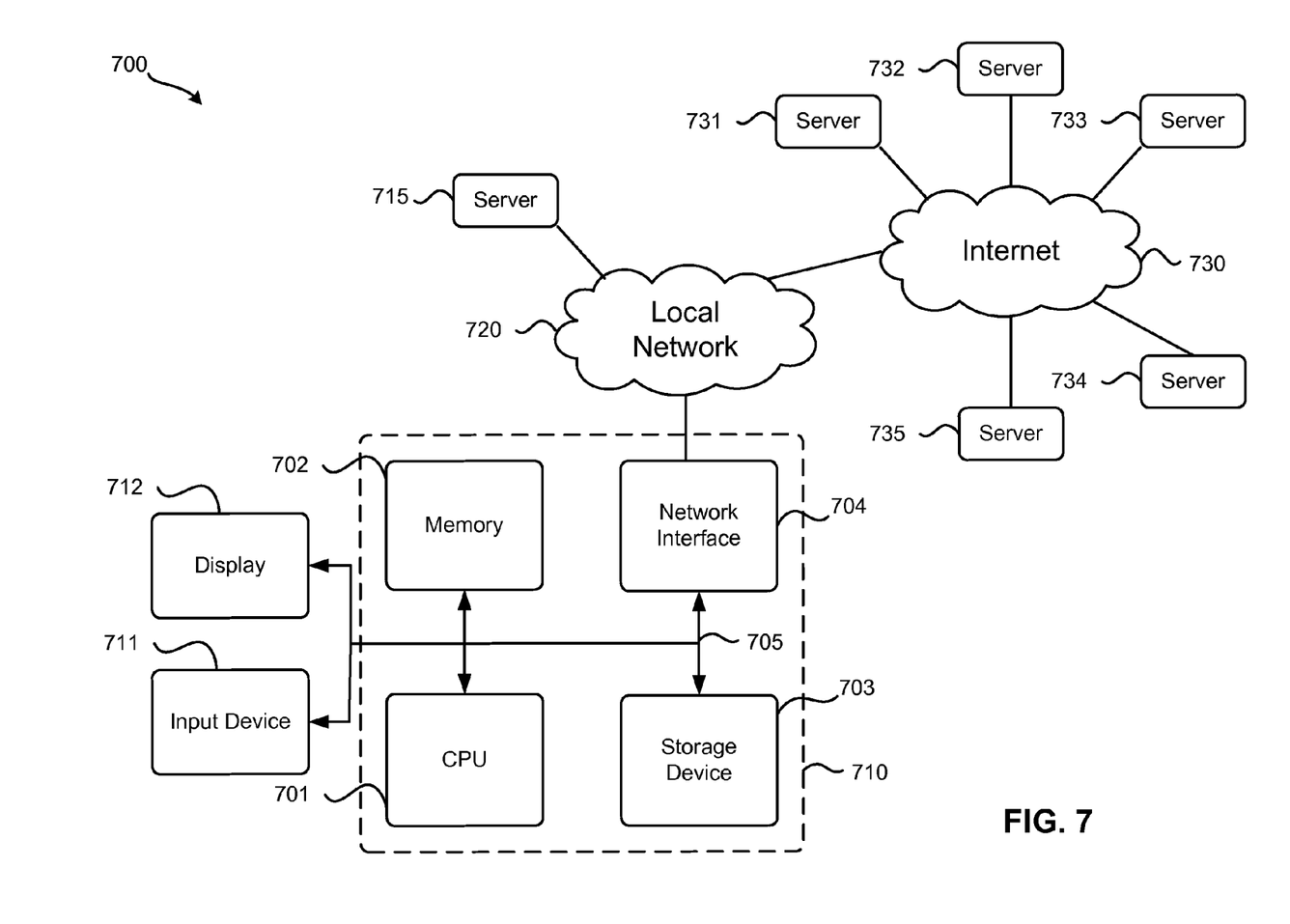
FIG. 7 illustrates an exemplary computer system according to one embodiment.

An exemplary computer system 700 is illustrated in FIG. 7. Computer system 710 includes a bus 705 or other communication mechanism for communicating information, and a processor 701 coupled with bus 705 for processing information. Computer system 710 also includes memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising: sending, from a mobile computing device to a first computing device, a first activation code to activate a first profile and a unique identifier associated with the mobile computing device, wherein the first activation code is generated by a second computing device different from the first computing device:

receiving, by the mobile computing device, the activated first profile from the first computing device, the activated first profile comprising a first connection information for establishing a first connection with a first application instance hosted on a third computing device different from the mobile computing device, the first computing device, and the second computing device, wherein the activated first profile is generated by the first computing device;

sending, from the mobile computing device to the first computing device, a second activation code to activate a second profile and the unique identifier associated with the mobile computing device, wherein the second activation code is generated by the second computing device;

receiving, by the mobile computing device, the activated second profile from the first computing device, the activated second profile comprising a second connection information for establishing a second connection with a second application instance hosted on a fourth computing device different from the mobile computing device, the first computing device, and the second computing device, wherein the activated second profile is generated by the first computing device;

storing the activated first profile and the activated second profile on the mobile computing device;

receiving, by the mobile computing device, a first credential configured to log into the first profile stored on the mobile computing device;

logging, by the mobile computing device, the first profile into the mobile computing device in response to the first credential;

establishing, by the mobile computing device, the first connection with the first application instance hosted on the third computing device according to the first connection information; and accessing, by the mobile computing device, data from the first application instance hosted on the third computing device when the first connection has been established, wherein the first profile and the second profile remain simultaneously activated on the mobile computing device for a period of time;

receiving, by the mobile computing device, a log out request associated with the first profile; and logging, by the mobile computing device, the first profile out of the mobile computing device in response to the log out request, wherein logging the first profile out includes clearing a cache of the mobile computing device;
wherein logging the first profile out further includes transmitting the cache to a server before clearing the cache, wherein the cache is retrieved from the server when the first profile logs back into the mobile computing device;
wherein the cache stores at least a portion of the data from the first application instance.

2. The computer-implemented method of claim 1, wherein the third computing device and the fourth computing device are the same computing device.

3. The computer-implemented method of claim 1, wherein the first profile belongs to a first user and the second profile belongs to a second user.

4. The computer-implemented method of claim 1 further comprising concealing a push notification of the second profile when the push notification is received while the first profile is logged into the mobile computing device.

5. A non-transitory computer readable storage medium storing one or more programs executable by a mobile computing device, the one or more programs comprising instructions for:
   sending to a first computing device a first activation code to activate a first profile and a unique identifier associated with the mobile computing device, wherein the first activation code is generated by a second computing device different from the first computing device:
   receiving the activated first profile from the first computing device, the activated first profile comprising a first connection information for establishing a first connection with a first application instance hosted on a third computing device different from the mobile computing device, the first computing device, and the second computing device, wherein the activated first profile is generated by the first computing device;
   sending to the first computing device a second activation code to activate a second profile and the unique identifier associated with mobile computing device, wherein the second activation code is generated by the second computing device;
   receiving the activated second profile from the first computing device, the activated second profile comprising a second connection information for establishing a second connection with a second application instance hosted on a fourth computing device different from the mobile computing device, the first computing device, and the second computing device, wherein the activated second profile is generated by the first computing device;
   storing the activated first profile and the activated second profile on the mobile computing device;
   receiving a first credential configured to log into the first profile stored on the mobile computing device;
   logging the first profile into the mobile computing device in response to the first credential;
   establishing the first connection with the first application instance hosted on the third computing device according to the first connection information; and
   accessing data from the first application instance hosted on the third computing device when the first connection has been established,
   wherein the first profile and the second profile remain simultaneously activated on the mobile computing device for a period of time;
   receiving a log out request associated with the first profile; and
   logging the first profile out of the mobile computing device in response to the log out request,
   wherein logging the first profile out includes clearing a cache of the mobile computing device;
   wherein logging the first profile out further includes transmitting the cache to a server before clearing the cache, wherein the cache is retrieved from the server when the first profile logs back into the mobile computing device;
   wherein the cache stores at least a portion of the data from the first application instance.

6. The non-transitory computer readable storage medium of claim 5, wherein the third computing device and the fourth computing device are the same computing device.

7. The non-transitory computer readable storage medium of claim 5, wherein the first profile belongs to a first user and the second profile belongs to a second user.

8. The non-transitory computer readable storage medium of claim 5, wherein the one or more programs further comprises instructions for concealing a push notification of the second profile when the push notification is received while the first profile is logged into the mobile computing device.

9. A computer implemented system comprising: one or more computer processors of a mobile computing device; and
   a non-transitory computer-readable storage medium comprising instructions, that when executed, control the one or more computer processors to be configured for:
   sending to a first computing device a first activation code to activate a first profile and a unique identifier associated with the mobile computing device, wherein the first activation code is generated by a second computing device different from the first computing device:
   receiving the activated first profile from the first computing device, the activated first profile comprising a first connection information for establishing a first connection with a first application instance hosted on a third computing device different from the mobile computing device, the first computing device, and the second computing device, wherein the activated first profile is generated by the first computing device;
   sending to the first computing device a second activation code to activate a second profile and the unique identifier associated with mobile computing device, wherein the second activation code is generated by the second computing device;
   receiving the activated second profile from the first computing device, the activated second profile comprising a second connection information for establishing a second connection with a second application instance hosted on a fourth computing device different from the mobile computing device, the first computing device, and the second computing device, wherein the activated second profile is generated by the first computing device;
   storing the activated first profile and the activated second profile on the mobile computing device;
   receiving a first credential configured to log into the first profile stored on the mobile computing device;
   logging the first profile into the mobile computing device in response to the first credential;
   establishing the first connection with the first application instance hosted on the third computing device according to the first connection information; and accessing data from the first application instance hosted on the third computing device when the first connection has been established, wherein the first profile and the second profile remain simultaneously activated on the mobile computing device for a period of time;

receiving a log out request associated with the first profile; and logging the first profile out of the mobile computing device in response to the log out request, wherein logging the first profile out includes clearing a cache of the mobile computing device;

wherein logging the first profile out further includes transmitting the cache to a server before clearing the cache, wherein the cache is retrieved from the server when the first profile logs back into the mobile computing device;

wherein the cache stores at least a portion of the data from the first application instance.

10. The computer implemented system of claim 9, wherein the first profile belongs to a first user and the second profile belongs to a second user.

11. The computer implemented system of claim 10, wherein the non-transitory computer readable medium further comprises instructions, that when executed, control the one or more computer processors to be configured for concealing a push notification of the second profile when the push notification is received while the first profile is logged into the mobile computing device.

* * * * *